(12) United States Patent
Yamaji

(10) Patent No.: US 7,263,094 B2
(45) Date of Patent: Aug. 28, 2007

(54) COMMUNICATION LINE CONNECTING ADAPTER AND COMMUNICATION LINE CONNECTING METHOD

(75) Inventor: Hirotaka Yamaji, Tokyo (JP)

(73) Assignee: NEC Corporation, Tokyo (JP)

( * ) Notice: Subject to any disclaimer, the term of this patent is extended or adjusted under 35 U.S.C. 154(b) by 815 days.

(21) Appl. No.: 10/720,306

(22) Filed: Nov. 25, 2003

(65) Prior Publication Data

US 2004/0105432 A1    Jun. 3, 2004

(30) Foreign Application Priority Data

Nov. 28, 2002   (JP) .............................. 2002-345850

(51) Int. Cl.
*H04L 12/66* (2006.01)
(52) U.S. Cl. ...................... 370/352; 370/466
(58) Field of Classification Search ................ 370/352, 370/524, 401, 466, 353, 354, 355, 356, 400, 370/465
See application file for complete search history.

(56) References Cited

U.S. PATENT DOCUMENTS

| | | | |
|---|---|---|---|
| 7,075,918 B1* | 7/2006 | Kung et al. .................. | 370/352 |
| 2002/0176403 A1* | 11/2002 | Radian ........................ | 370/352 |
| 2003/0174695 A1* | 9/2003 | Lautenschlager et al. ... | 370/352 |
| 2003/0227540 A1* | 12/2003 | Monroe .................... | 348/14.02 |

FOREIGN PATENT DOCUMENTS

| | | |
|---|---|---|
| JP | 3-135148 | 6/1991 |
| JP | 5-14583 | 1/1993 |
| JP | 5-68118 | 3/1993 |
| JP | 11-220549 | 8/1999 |
| JP | 2000-216911 | 8/2000 |
| JP | 2000-354071 | 12/2000 |
| JP | 2001-186193 | 7/2001 |
| JP | 2001-257797 | 9/2001 |
| JP | 2001-292244 | 10/2001 |
| JP | 2001-298542 | 10/2001 |

* cited by examiner

*Primary Examiner*—Creighton Smith
(74) *Attorney, Agent, or Firm*—McGinn IP Law Group, PLLC

(57) ABSTRACT

Disclosed is a communication line connecting adapter which adequately connects an ordinary telephone, IP phone and modem/facsimile machine to a connecting party. The adapter comprises first to third switches, a line which connects a common terminal of the first switch to the modem/facsimile machine via a first DAA circuit, a line which connects a zeroth node terminal of the first switch to a public telephone line and a common terminal of the second switch, a line which connects a first node terminal of the first switch to a VoIP gateway via an SLIC, a line which connects the first node terminal of the first switch to a zeroth node terminal of the third switch, a line which connects a zeroth node terminal of the second switch to the VoIP gateway via a second DAA circuit, a line which connects a first node terminal of the second switch to a first node terminal of the third switch, and a line which connects a common terminal of the third switch to an extension line.

7 Claims, 14 Drawing Sheets

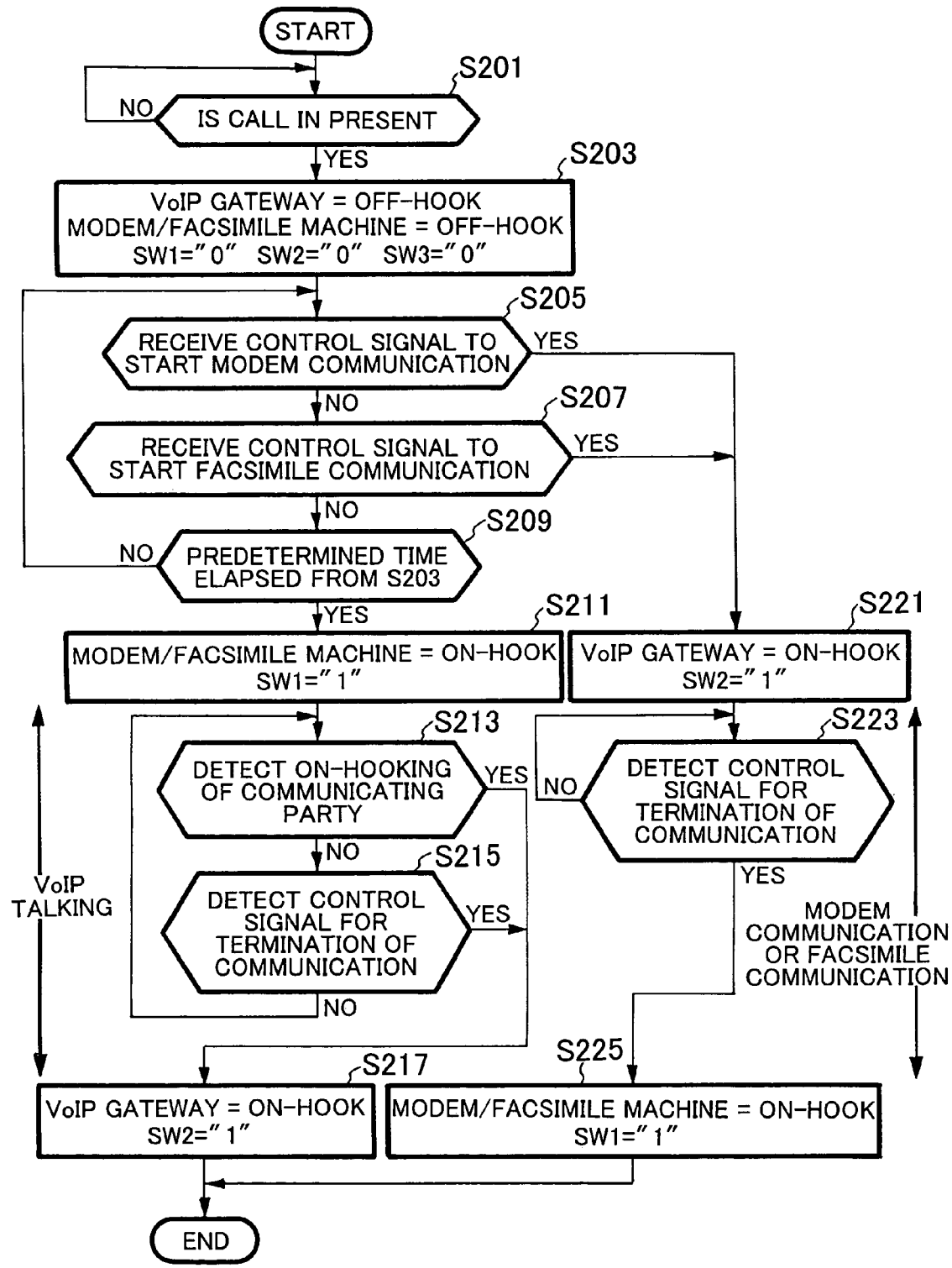

COMMUNICATION LINE CONNECTING ADAPTER AND COMMUNICATION LINE CONNECTING METHOD

BACKGROUND OF THE INVENTION

1. Field of the Invention

The present invention relates to a communication line connecting adapter which connects a public telephone line, an extension line (an internal lines), Voice over Internet Protocol (VoIP) gateway and a modem/facsimile machine.

2. Description of the Related Art

With the progress of the Internet technology, telephone communication using the Internet (so-called IP phone) is becoming popular.

The telephone communication over the Internet uses a protocol, such as H.323 or Session Initiation Protocol (SIP).

The following describes some modes of the telephone communication over the Internet.

A local area exchanger connected to a public telephone line is connected to a VoIP gateway which is connected to a local area IP network (such as Local Area Network(LAN) and Wide Area Network(WAN)), and another VoIP gateway is connected to the local area IP network. Ordinary telephones are connected to each VoIP gateway. This connection can allow the extensions (internal lines) in a company to be constructed by an IP network and eliminates the need for constructing the extensions by a telephone network. However, to connect an extension to an outside line, a public telephone line should be used. This is a local area telephone communication over the Internet.

On the other hand, each VoIP gateway is connected to each router connected to the Internet (global IP network) and an ordinary telephone is connected to each VoIP gateway directly or via an extension line. This connection eliminates the need for a public telephone line to communicate with an outside line, therefore this connection leads to a reduction in a telephone charge. This is a WAN telephone communication over the Internet.

The "VoIP gateway" mainly converts an analog voice signal to digital voice data, divides the digitized voice data and triply encapsulates the divided digital data by using a Real-Time Transport Protocol (RTP) packet, an User Datagram Protocol (UDP) packet and an Internet Protocol (IP) packet in communication in one direction, and further extracts digitized voice data from an IP packet and converts the extracted voice data to an analog voice signal in communication in the other direction.

The following are the prior art documents relating to the present invention.

Patent Document 1: JP-A-1991-135148
Patent Document 2: JP-A-1993-14583
Patent Document 3: JP-A-1993-68118
Patent Document 4: JP-A-2000-354071
Patent Document 5: JP-A-2001-186193
Patent Document 6: JP-A-2001-298542

The invention disclosed in the Patent Document 1 can enable data communication of data terminals with each other without redialing by connecting multifunction telephone terminals and data terminals to each line circuit and pressing a predetermined button on one multifunction telephone terminal while the multifunction telephone terminal is communicating with another multifunction telephone terminal. This invention allows talking and data communication using the same line.

In the invention disclosed in Patent Document 2, immediately after a line is closed, a guidance voice message is sent and a selector circuit is switched to the modem side, transmission of a called terminal identification signal CED and digital identification signal DIS and detection of a digital command signal DCS are repeated, and facsimile reception is started if the digital command signal DCS is detected during the repetitive operation and the selector circuit is switched to the telephone side to start talking if off-hook is detected during the repetitive operation. As this invention causes a communicating party to wait for the process to be switched while a guidance voice message is sent and, the operability for the communicating party is not high. Even while process switching is being monitored, talking can begin soon in case that a communication station side (an other end of the line) is a telephone, but facsimile communication cannot be started or continued unless the telephone is on-hooked again, if telephone is once off-hooked, in case that the communication station side (the other end of the line) is a facsimile.

In the invention disclosed in Patent Document 3, a calling tone CNG from a communication station side (an other end of the line) or an off-hooking on own station side is waited while ringing a quasi ringback tone until a predetermined time elapses after closing of a line.

If the calling tone CNG is firstly detected in the predetermined time, a sequence associated with a predetermined called terminal identification signal CED, digital identification signal DIS and digital command signal DCS for facsimile reception is started and if off-hooking is firstly detected in the predetermined time, talking starts. On the other hand, if neither the calling tone CNG nor off-hooking is detected in the predetermined time, the sequence associated with the predetermined called terminal identification signal CED, digital identification signal DIS and digital command signal DCS for facsimile reception is started.

In the invention disclosed in Patent Document 4, WAN telephone communication over the Internet is generally performed and the WAN telephone communication is switched to the mode using a public telephone line when the quality of the WAN telephone communication is degraded.

The invention disclosed in Patent Document 5 relates to a VoIP gateway that is used in the aforementioned WAN telephone communication over the Internet.

The invention disclosed in Patent Document 6 can ensure that a received call from an outside line is transferred to an existing extension telephone network and network simultaneously used and can permit a response to a telephone call from an outside line received even when a failure occurs.

In a local area telephone communication over the Internet, a public telephone network is connected to a VoIP gateway. However, a facsimile machine and a modem may further be connected to the public telephone network. There was no prior art technique which would cope with how to control the connection in case where a VoIP gateway, a facsimile machine and a modem are connected to a public telephone network.

At present, ordinary telephones and IP phones coexist. Because one of an ordinary telephone and IP phone is used in the local area and one of the ordinary telephone and IP phone is used on the talking party side, there are four kinds of connections possible. However, there was no prior art technique which would cope with all of the four kinds of connections.

In case that a user owns an IP phone, it is likely that there is a growing demand of receiving not only a call for the IP phone but also a call for an ordinary telephone by using the IP phone.

SUMMARY OF THE INVENTION

Accordingly, an object of the present invention is to provide a communication line connecting adapter which can adequately control off-hook and on-hook when a VoIP gateway and a modem/facsimile machine are connected to a public telephone network.

Another object of the invention is to provide a communication line connecting adapter which can adequately connect an ordinary telephone, an IP phone, a facsimile machine and a model to a connecting destination.

A further object of the invention is to provide a communication line connecting adapter which can allow an IP phone to receive a call for an ordinary telephone as well as a call for the IP phone.

According to the first aspect of the invention, there is provided a communication line connecting adapter comprising a VoIP (Voice over Internet Protocol) gateway which performs protocol conversion for telephone communication; means which connects a call bound for a general telephone to the general telephone; means which connects a call bound for an IP (Internet Protocol) phone to the general telephone via the VoIP gateway; and means which connects a call bound for the general telephone to the IP phone via the VoIP gateway.

The communication line connecting adapter according to the first aspect of the invention may further comprise means which connects an incoming call to the VoIP gateway and a modem/facsimile section; means which judges whether or not a control signal for initiating facsimile communication or modem communication has come from a calling party; means which disconnects the VoIP gateway from a public telephone line when it is judged that the control signal has come; and means which disconnects the modem/facsimile section from the public telephone line when it is judged that the control signal has not come yet.

The communication line connecting adapter according to the first aspect of the invention may further comprise a modem/facsimile section which performs modem communication and facsimile communication; and means which connects the VoIP gateway to the modem/facsimile section.

The communication line connecting adapter according to the first aspect of the invention may further comprise a modem/facsimile section which performs modem communication and facsimile communication; and means which connects the modem/facsimile section to an outside number.

The communication line connecting adapter according to the first aspect of the invention may further comprise a modem/facsimile section which performs modem communication and facsimile communication; and means which connects the modem/facsimile section to an extension line.

According to the second aspect of the invention, there is provided a communication line connecting adapter which connects a public telephone line, an extension line, a VoIP (Voice over Internet Protocol) gateway and a modem/facsimile section and comprises a first switch; a second switch; a third switch; a line which connects a common terminal of the first switch to the modem/facsimile section via a first DAA (Data Access Arrangement) circuit; a line which connects a zeroth node terminal of the first switch to the public telephone line and a common terminal of the second switch; a line which connects a first node terminal of the first switch to the VoIP gateway via an SLIC (Subscriber Line Interface Circuit); a line which connects the first node terminal of the first switch to a zeroth node terminal of the third switch; a line which connects a zeroth node terminal of the second switch to the VoIP gateway via a second DAA circuit; a line which connects a first node terminal of the second switch to a first node terminal of the third switch; and a line which connects a common terminal of the third switch to the extension line.

The communication line connecting adapter according to the second aspect of the invention may further comprise means which connects the public telephone line to the VoIP gateway and the modem/facsimile section by connecting the common terminal of the first switch to the zeroth node terminal thereof and connecting the common terminal of the second switch to the zeroth node terminal thereof, when there is an incoming call from the public telephone line; means which judges whether or not a control signal for initiating facsimile communication or modem communication has come from a calling party; means which disconnects the VoIP gateway from the public telephone line by connecting the common terminal of the second switch to the first node terminal thereof when it is judged that the control signal has come; and means which disconnects the modem/facsimile section from the public telephone line by connecting the common terminal of the first switch to the first node terminal thereof when it is judged that the control signal has not come yet.

In the communication line connecting adapter according to the second aspect of the invention, when the communication line connecting adapter is not powered on, the common terminal of the second switch may be connected to the first node terminal thereof and the common terminal of the third switch may be connected to the first node terminal thereof.

The communication line connecting adapter according to the second aspect of the invention may further comprise means which connects the extension line to the VoIP gateway by connecting the common terminal of the third switch to the zeroth node terminal thereof.

The communication line connecting adapter according to the second aspect of the invention may further comprise the VoIP gateway and wherein the VoIP gateway may be connected to an IP network and the extension line may be connected to the IP network by connecting the common terminal of the third switch to the zeroth node terminal thereof.

According to the third aspect of the invention, there is provided a communication line connecting method which uses the above-described communication line connecting adapter and comprises the steps of connecting the public telephone line to the VoIP gateway and the modem/facsimile section by connecting the common terminal of the first switch to the zeroth node terminal thereof and connecting the common terminal of the second switch to the zeroth node terminal thereof, when there is an incoming call from the public telephone line; judging whether or not a control signal for initiating facsimile communication or modem communication has come from a calling party; disconnecting the VoIP gateway from the public telephone line by connecting the common terminal of the second switch to the first node terminal thereof when it is judged that the control signal has come; and disconnecting the modem/facsimile section from the public telephone line by connecting the common terminal of the first switch to the first node terminal thereof when it is judged that the control signal has not come yet.

BRIEF DESCRIPTION OF THE DRAWINGS

FIG. 14 is a flowchart illustrating a switch control method in case that there is a call received from a public telephone line according to the embodiment of the invention.

DETAILED DESCRIPTION OF THE PREFERRED EMBODIMENT

A preferred embodiment according to the present invention will be described hereunder with reference to the accompanying drawings.

Figure 1:
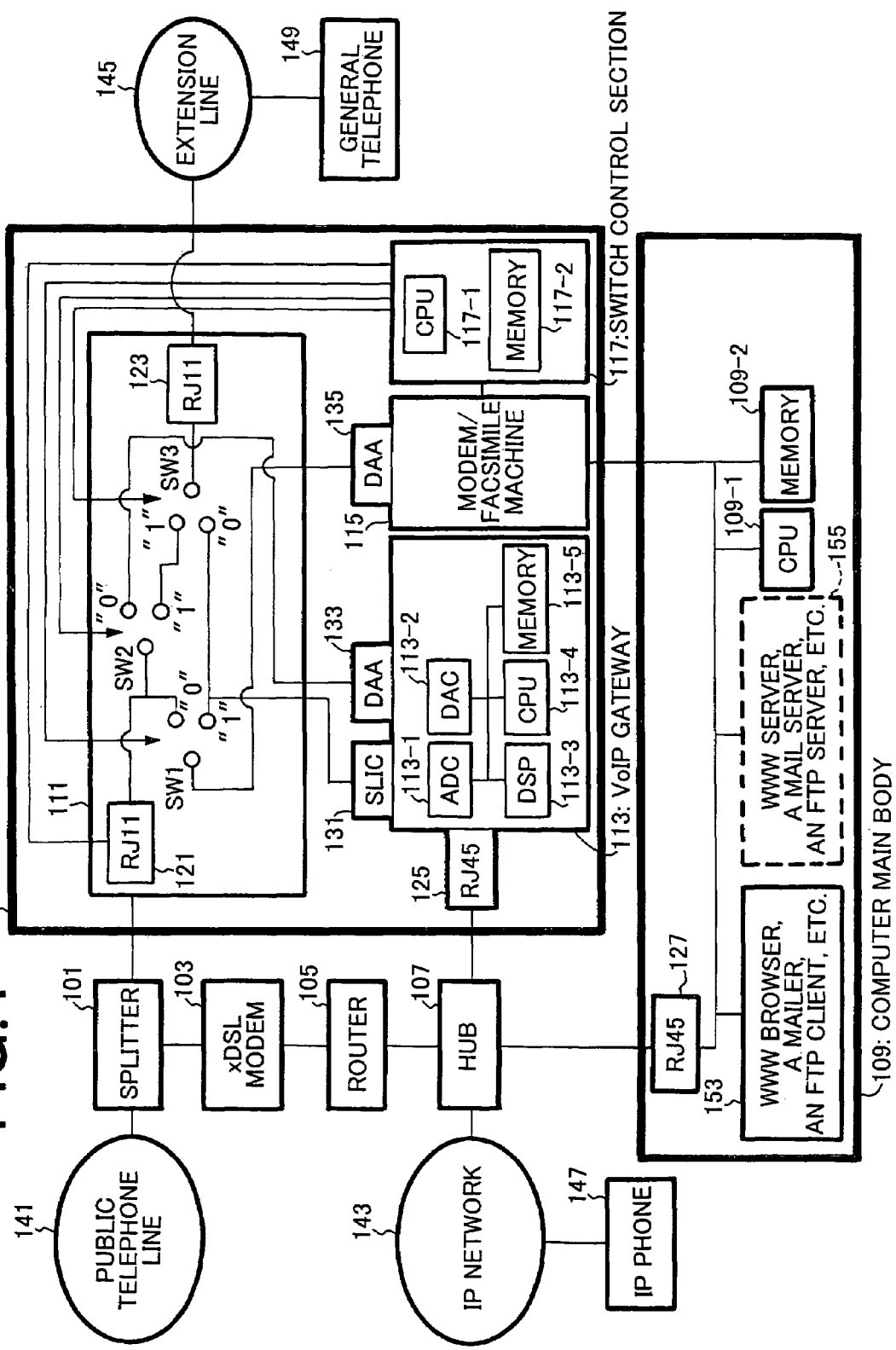
FIG. 1 is a block diagram illustrating a communication system including a communication line connecting adapter according to one embodiment of the invention.

FIG. 1 illustrates a communication system including a communication line connecting adapter according to one embodiment of the invention.

In FIG. 1, the communication system comprises splitter 101, xDSL (x Digital Subscriber Line; "x" denotes asymmetric, symmetric, high-bit-rate and very-high-bit-rate) modem 103, router 105, hub 107, computer main body 109, switch group 111, VoIP gateway 113, modem/facsimile machine (modem/facsimile section) 115, switch control section 117, Registered Jack (RJ) 11 terminals 121 and 123, RJ45 terminals 125 and 127, Subscriber Line Interface Circuit (SLIC) 131, Data Access Arrangement (DAA) circuits 133 and 135, public telephone line 141, IP network 143, extension line 145, IP phone 147 and general telephone 149.

Communication line connecting adapter 119 comprises the switch group 111, the VoIP gateway 113, the modem/facsimile machine 115, the SLIC 131, the DAA circuit 133, the RJ11 terminals 121 and 123, the RJ45 terminal 125 and a printed circuit board on which those components are mounted. The communication line connecting adapter 119 is connected to the computer main body 109 via a Peripheral Component Interconnect (PCI) bus or the like. The modem/facsimile machine 115 is an on-board type having a modem/facsimile signal processing section, but it may be an independent type. The IP network 143 is a LAN or WAN. The IP phone 147 is connected to the IP network 143, but the IP phone may be constituted by software installed on the computer main body 109, a microphone and headphone connected to the computer main body 109. The general telephone 149 may be connected directly to the RJ11 terminal 123. In case that the computer main body 109 operates as a client on Internet, a WWW browser, a mailer, an FTP client, or the like 144 is installed on the computer main body 109. In case that the computer main body 109 operates as a server on Internet, a WWW server, a mail server, an FTP server, or the like 155 is installed on the computer main body 109. The computer main body 109 may have a function as a home server.

The computer main body 109 has CPU 109-1 and memory 109-2. As the CPU 109-1 loads and runs a program stored in the memory 109-2, the functions of the WWW browser, etc. 153 or the WWW server, etc. 155 are achieved. Though not illustrated, the computer main body 109 also has an auxiliary memory device, input/output device and a bridge or the like between each buse (PCI bus, etc.) and a host bus.

The VoIP gateway 113 has analog/digital converter (ADC) 113-1, digital/analog converter (DAC) 113-2, Digital Signal Processor (DSP) 113-3, Central Processing Unit (CPU) 113-4 and memory 113-5 and the following processes is performed as those components work cooperatively. That is, the VoIP gateway 113 mainly converts an analog voice signal to digital voice data, divides the digitized voice data and triply encapsulates the divided digital data by using a Real-Time Transport Protocol (RTP) packet, an User Datagram Protocol (UDP) packet and an Internet Protocol (IP) packet in communication in one direction, and further extracts digitized voice data from an IP packet and converts the extracted voice data to an analog voice signal in communication in the other direction.

The VoIP gateway 113 may hold the correlation between direct numbers for general telephone lines and the IP addresses of IP phones in the memory 113-5 and call an IP phone corresponding to the telephone number of a calling general telephone. In case that a direct number for a general telephone line is not used and only a pilot number for general telephones is used, all the IP phones may be ringed when a call has been made to the pilot number for general telephones as the destination telephone number. Then, the IP phone that is off-hooked may be connected to the calling party.

The modem/facsimile machine 115 may be constituted only by hardware or may be partly constituted by software. The software section is realized by what the CPU 109-1 loads and runs a program stored in the memory 109-2.

The switch control section 117 has CPU 117-1 and memory 117-2 and controls switches SW1, SW2 and SW3 to be discussed later by what the CPU 117-1 loads and runs a program stored in the memory 117-2. The switch control section 117 may not be equipped with the CPU 117-1 but may use the CPU 113-4 or the CPU 109-1 by a time-sharing manner.

The switch group 111 has three switches SW1, SW2 and SW3. The common terminal of the switch SW1 is connected to the modem/facsimile machine 115 via the DAA circuit 135 by a wiring. The zeroth node terminal of the switch SW1 is connected to the common terminal of the switch SW2 by a wiring and is further connected to the splitter 101 via the RJ11 terminal 121. The first node terminal of the switch SW1 is connected to the zeroth node terminal of the switch SW3 by a wiring and is further connected to the VoIP gateway 113 via the SLIC 131. The zeroth node terminal of the switch SW2 is connected to the VoIP gateway 113 via the DAA circuit 133 by a line. The first node terminal of the switch SW2 is connected to the first node terminal of the switch SW3 by a wiring. The common terminal of the switch SW3 is connected to the extension line 145 via the RJ11 terminal 123.

Next, the correlation between the positions of the switches SW1, SW2 and SW3 and the connections of the individual sections will be described.

Figure 2:
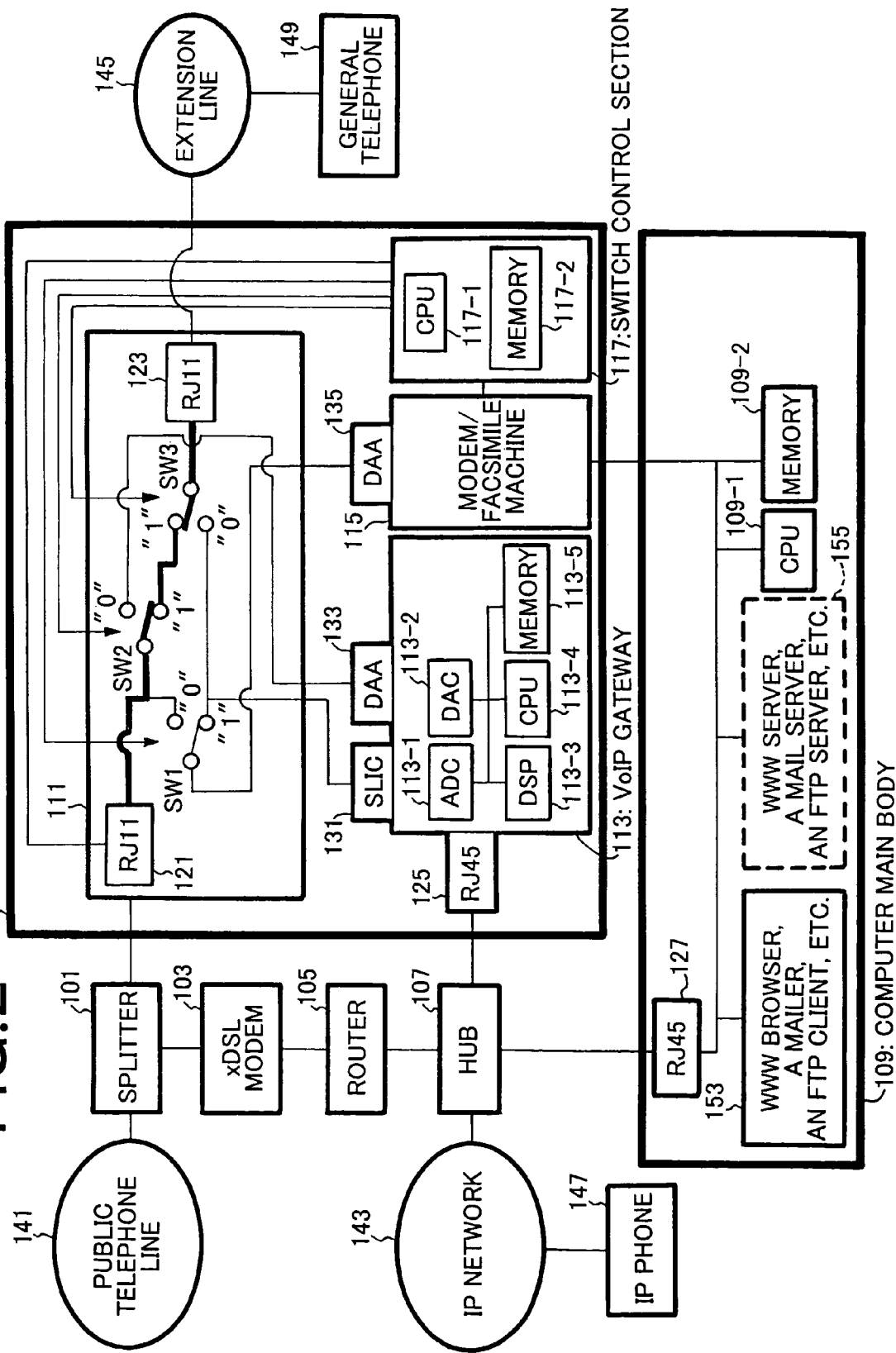
FIG. 2 is a diagram showing a connection relationship when the switch positions of the communication line connecting adapter are SW1="1", SW2="1" and SW3="1"

As shown in FIG. 2, when the common terminal of the switch SW1 is connected to the first node terminal thereof, the common terminal of the switch SW2 is connected to the first node terminal thereof and the common terminal of the switch SW3 is connected to the first node terminal thereof, the RJ11 terminal 121 is connected to the RJ11 terminal 123. This can allow the general telephone 149 to communicate with another general telephone connected to the public telephone line 141. Such connection may be realized when the computer main body 109 is not powered on and the communication line connecting adapter 119 is not thus powered on. Such connection may also be realized when the communication line connecting adapter 119 is powered on and the user intends to cause the general telephone 149 to communicate with another general telephone connected to the public telephone line. Such a connection mode is effective because emergency calls to numbers 110, 119 and so forth cannot be made through an IP phone.

Figure 3:
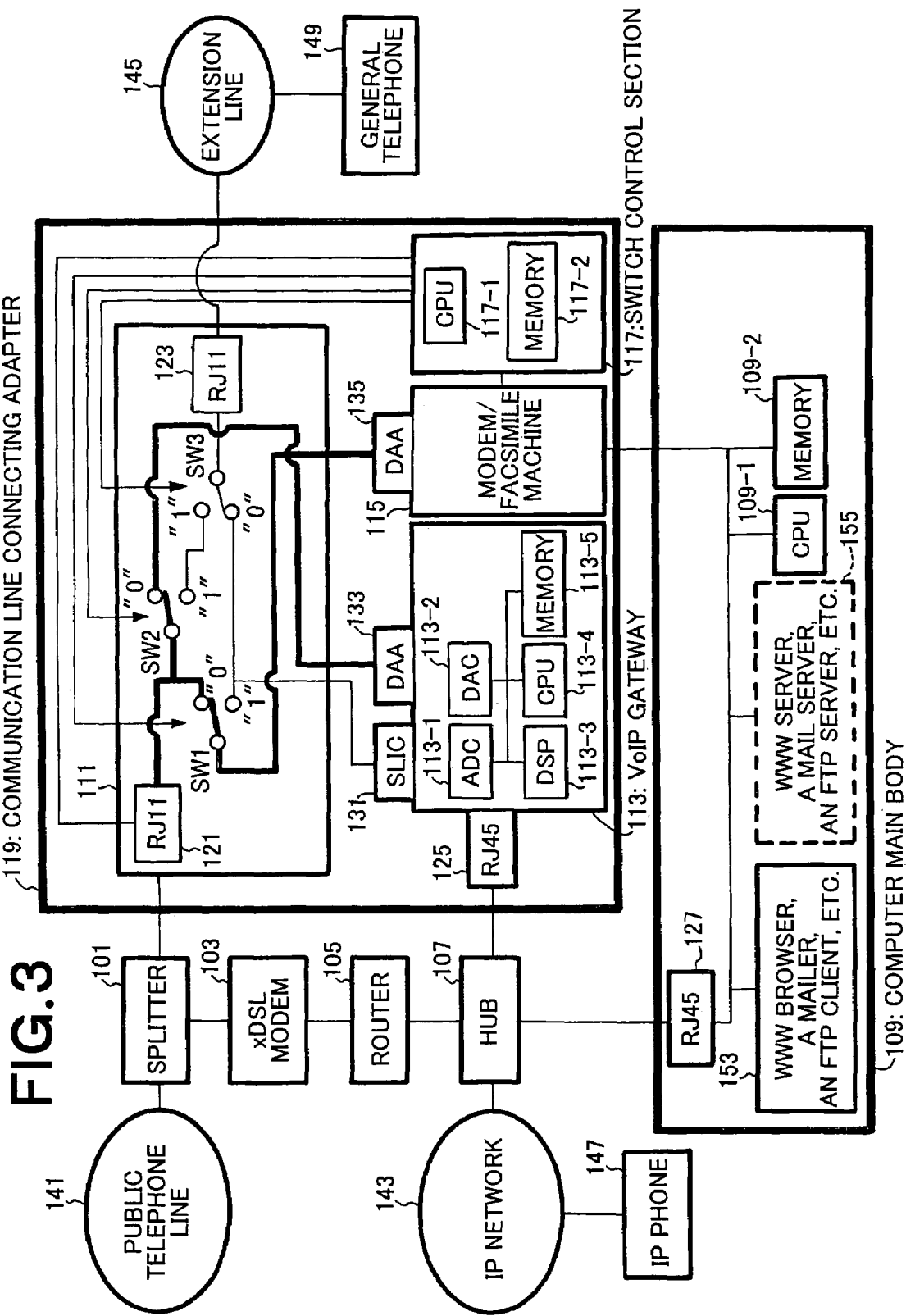
FIG. 3 is a diagram showing a first connection relationship when the switch positions of the communication line connecting adapter are SW1="0", SW2="0" and SW3="0"

As shown in FIG. 3, when the common terminal of the switch SW1 is connected to the zeroth node terminal thereof, the common terminal of the switch SW2 is connected to the zeroth node terminal thereof and the common terminal of the switch SW3 is connected to the zeroth node terminal thereof, the RJ11 terminal 121 is connected to the DAA circuit 133 and DAA circuit 135. Therefore, the VoIP gateway 113 and the modem/facsimile machine 115 are connected to the public telephone line 141. As will be discussed later, this connection is firstly made when there is a call from the public telephone line 141.

Figure 4:
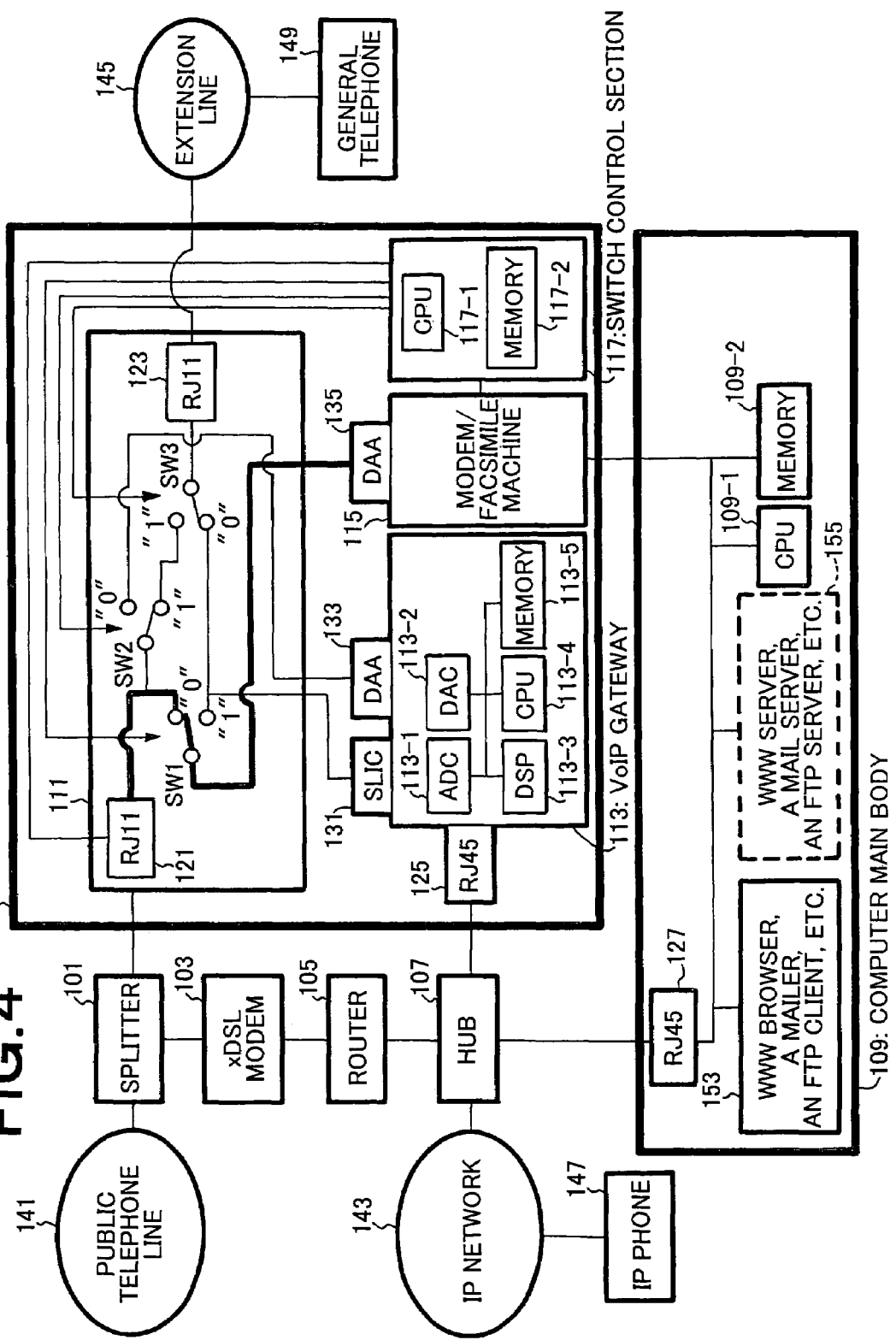
FIG. 4 is a diagram showing the first connection relationship when the switch positions of the communication line connecting adapter are SW1="0", SW2="1" and SW3="0"

As shown in FIG. 4, when the common terminal of the switch SW1 is connected to the zeroth node terminal thereof, the common terminal of the switch SW2 is connected to the first node terminal thereof and the common terminal of the switch SW3 is connected to the zeroth node terminal thereof, the RJ11 terminal 121 is connected to the DAA circuit 135. Therefore, the modem/facsimile machine 115 is connected to the public telephone line 141. Meanwhile, the VoIP gateway 113 is disconnected from the public telephone line 141. As will be discussed later, this connection relationship is realized when it is judged that a call made from the public telephone line 141 has been made from a modem or a facsimile machine connected to the public telephone line 141.

Figure 5:
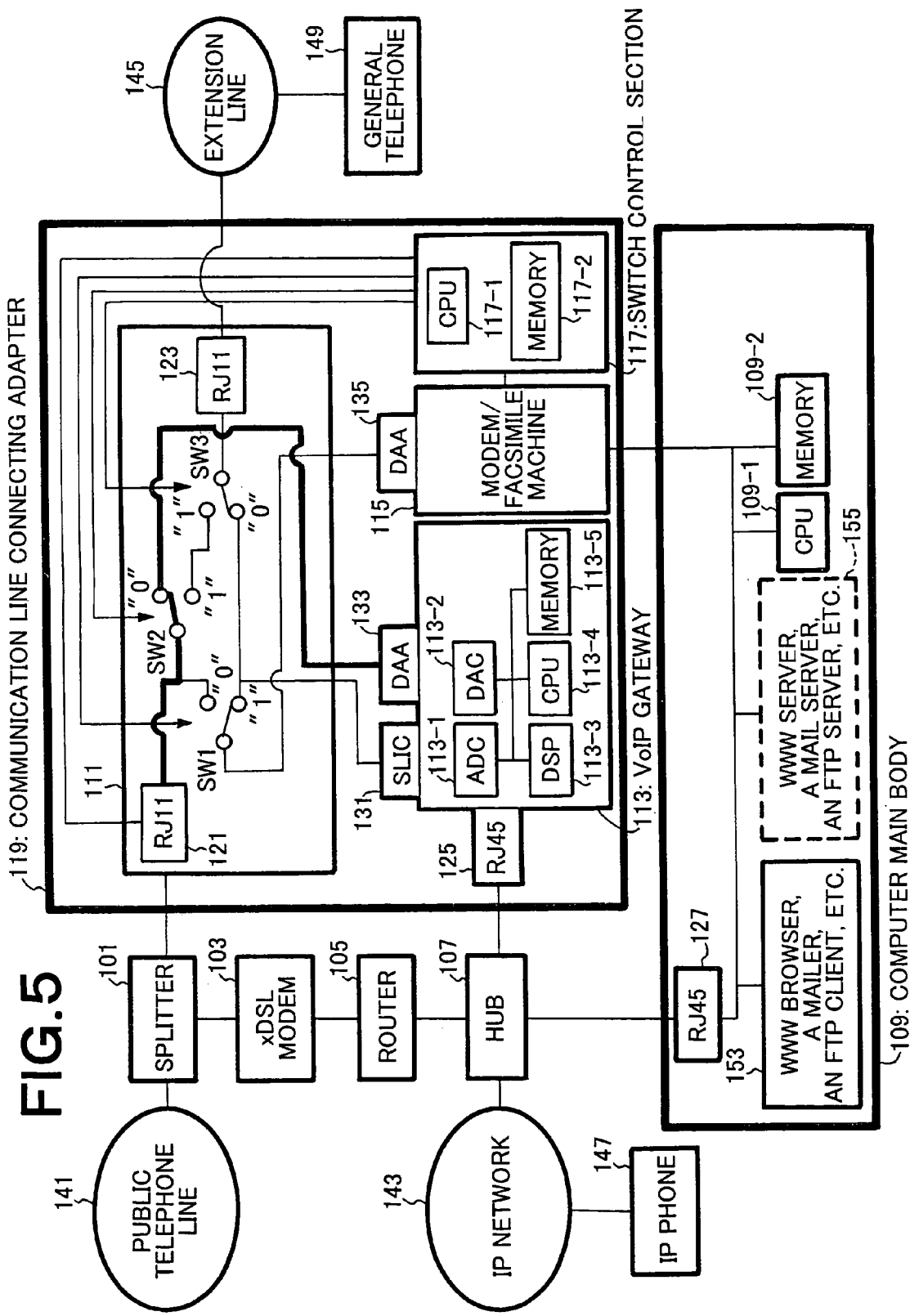
FIG. 5 is a diagram showing the first connection relationship when the switch positions of the communication line connecting adapter are SW1="1", SW2="0" and SW3="0"

As shown in FIG. 5, when the common terminal of the switch SW1 is connected to the first node terminal thereof, the common terminal of the switch SW2 is connected to the zeroth node terminal thereof and the common terminal of the switch SW3 is connected to the zeroth node terminal thereof, the RJ11 terminal 121 is connected to the DAA circuit 133. Therefore, the VoIP gateway 113 is connected to the public telephone line 141. Meanwhile, the modem/facsimile machine 115 is disconnected from the public telephone line 141. As will be discussed later, this connection relationship is realized when it is judged that a call made from the public telephone line 141 has been made from neither a modem nor a facsimile machine connected to the public telephone line 141.

Figure 6:
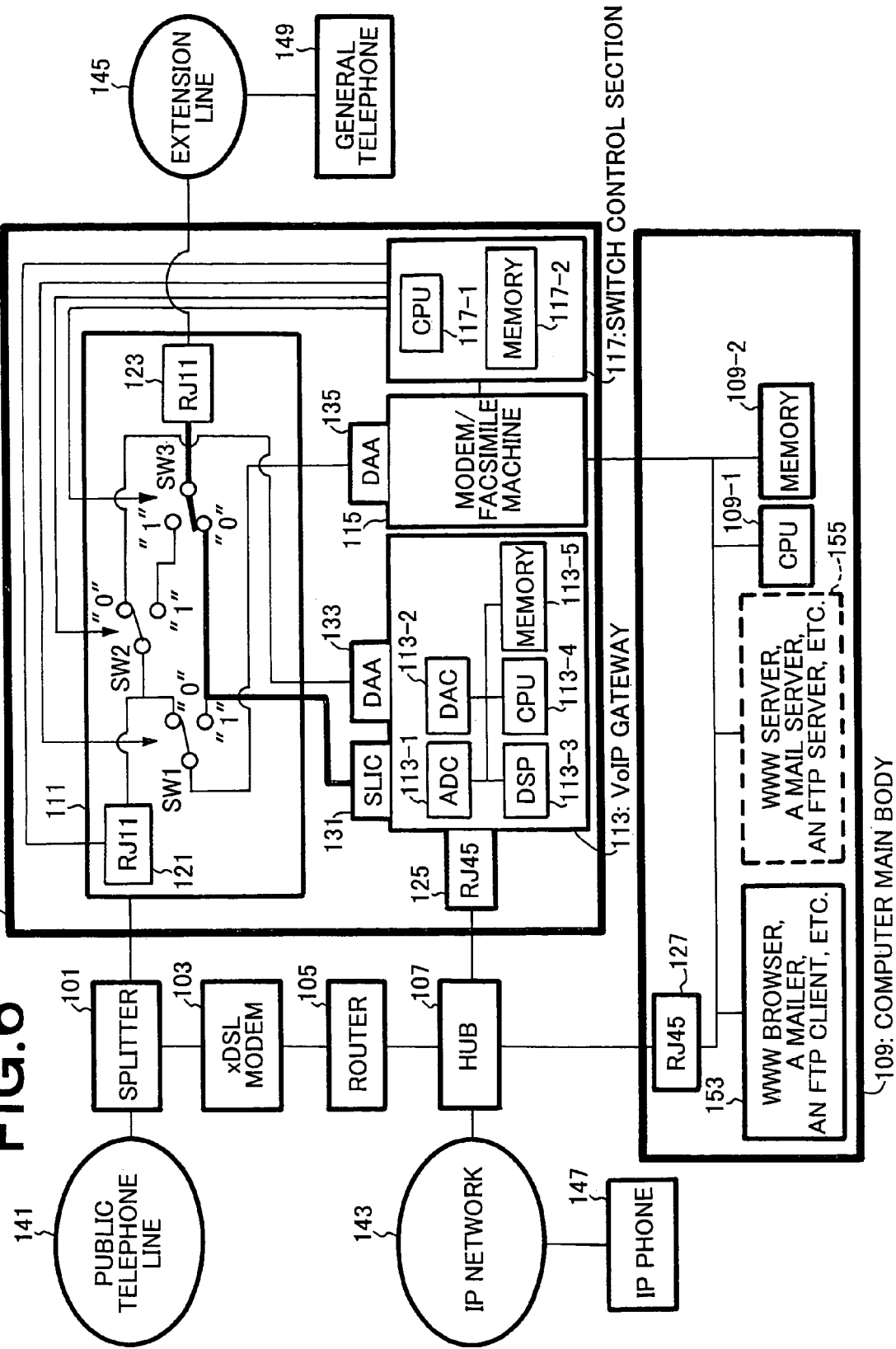
FIG. 6 is a diagram showing a second connection relationship when the switch positions of the communication line connecting adapter are SW1="0", SW2="0" and SW3="0"

As shown in FIG. 6, when the common terminal of the switch SW1 is connected to the zeroth node terminal thereof, the common terminal of the switch SW2 is connected to the zeroth node terminal thereof and the common terminal of the switch SW3 is connected to the zeroth node terminal thereof as in FIG. 3, the SLIC 131 is connected to the RJ11 terminal 123. Therefore, a communicating IP phone is connected to the general telephone 149 via the Internet, the exchanger, the public telephone line 141, the splitter 101, the xDSL modem 103, the router 105, the hub 107, the RJ45 terminal 125, the VoIP gateway 113, the SLIC -131, the RJ11 terminal 123 and the extension line 145. The IP phone 147 is connected to the general telephone 149 via the IP network 143, the hub 107, the RJ45 terminal 125, the VoIP gateway 113, the SLIC 131, the RJ11 terminal 123 and the extension line 145.

Figure 7:
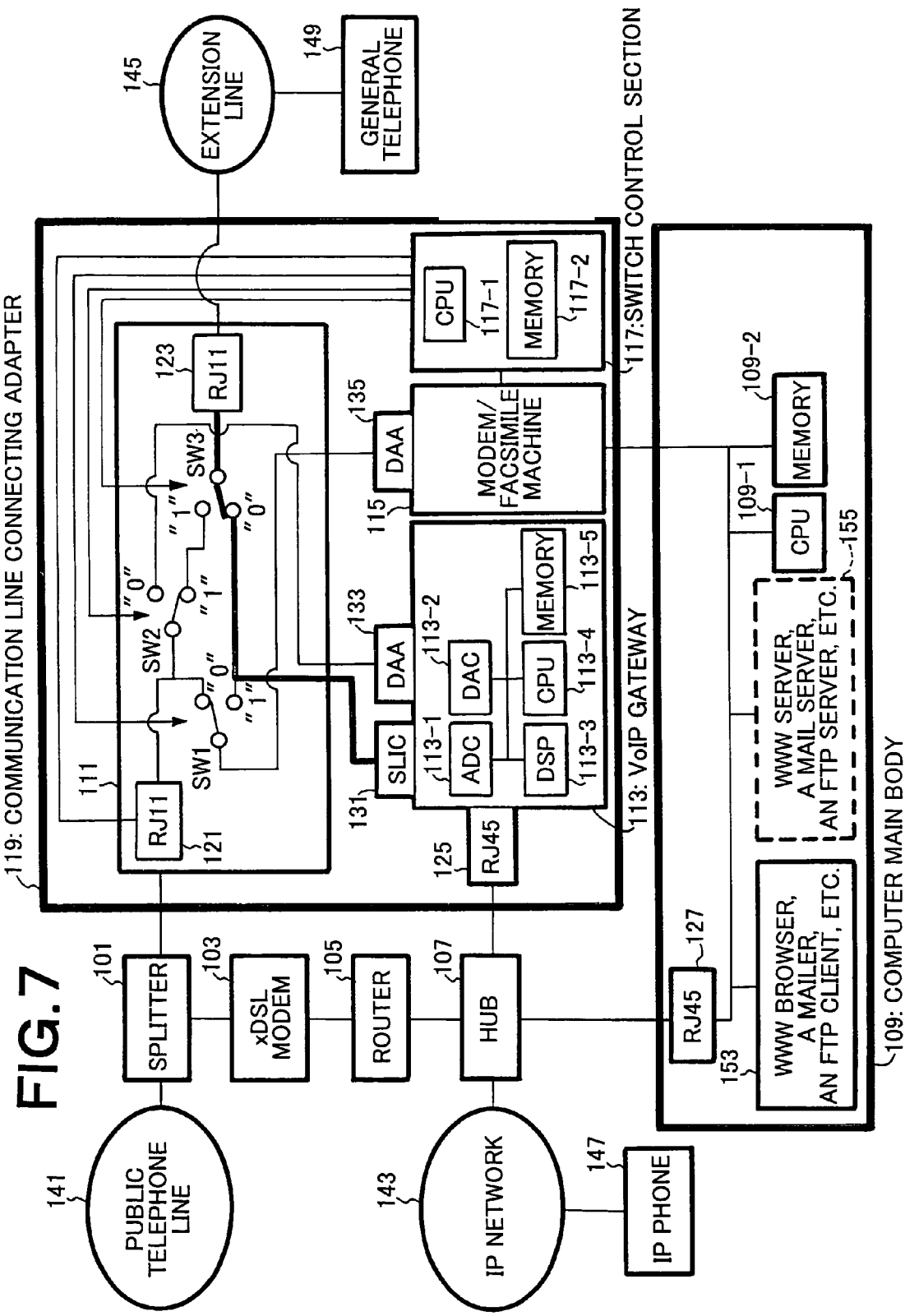
FIG. 7 is a diagram showing the second connection relationship when the switch positions of the communication line connecting adapter are SW1="0", SW2="1" and SW3="0"

As shown in FIG. 7, when the common terminal of the switch SW1 is connected to the zeroth node terminal thereof, the common terminal of the switch SW2 is connected to the first node terminal thereof and the common terminal of the switch SW3 is connected to the zeroth node terminal thereof as in FIG. 4, the SLIC 131 is connected to the RJ11 terminal 123 as in FIG. 6. Therefore, a communicating IP phone is connected to the general telephone 149 via the Internet, the exchanger, the public telephone line 141, the splitter 101, the xDSL modem 103, the router 105, the hub 107, the RJ45 terminal 125, the VoIP gateway 113, the SLIC 131, the RJ11 terminal 123 and the extension line 145. The IP phone 147 is connected to the general telephone 149 via the IP network 143, the hub 107, the RJ45 terminal 125, the VoIP gateway 113, the SLIC 131, the RJ11 terminal 123 and the extension line 145.

Figure 8:
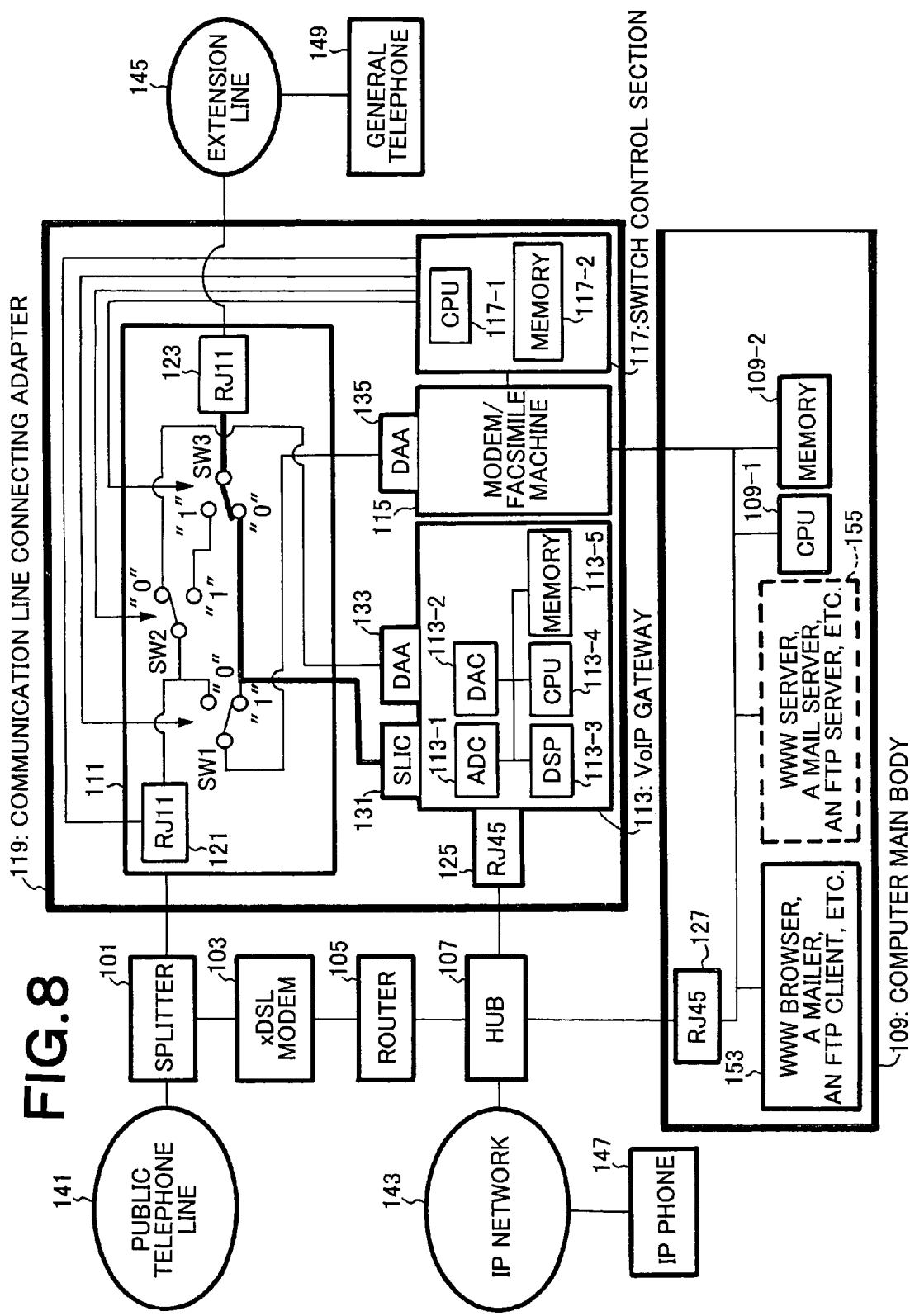
FIG. 8 is a diagram showing the second connection relationship when the switch positions of the communication line connecting adapter are SW1="1", SW2="0" and SW3="0"

As shown in FIG. 8, when the common terminal of the switch SW1 is connected to the first node terminal thereof, the common terminal of the switch SW2 is connected to the zeroth node terminal thereof and the common terminal of the switch SW3 is connected to the zeroth node terminal thereof as in FIG. 5, the SLIC 131 is connected to the RJ11 terminal 123 as in FIGS. 6 and 7. Therefore, a communicating IP phone is connected to the general telephone 149 via the Internet, the exchanger, the public telephone line 141, the splitter 101, the xDSL modem 103, the router 105, the hub 107, the RJ45 terminal 125, the VoIP gateway 113, the SLIC 131, the RJ11 terminal 123 and the extension line 145. The IP phone 147 is connected to the general telephone 149 via the IP network 143, the hub 107, the RJ45 terminal 125, the VoIP gateway 113, the SLIC 131, the RJ11 terminal 123 and the extension line 145.

As apparent from FIGS. 6, 7 and 8, the SLIC 131 is connected to the RJ11 terminal 123, regardless of the connection positions of the switches SW1 and SW2, if the common terminal of the switch SW3 is connected to the zeroth node terminal thereof. Therefore, a communicating IP phone is connected to the general telephone 149 via the Internet, the exchanger, the public telephone line 141, the splitter 101, the xDSL modem 103, the router 105, the hub 107, the RJ45 terminal 125, the VoIP gateway 113, the SLIC 131, the RJ11 terminal 123 and the extension line 145. At this time, WAN telephone communication over the Internet can be executed using the general telephone 149. So-called IP phones which are becoming popular are of this type. The structure of this type leads to a low communication charge by using the Internet, and a general telephone can be used. The IP phone 147 is connected to the general telephone 149 via the IP network 143, the hub 107, the RJ45 terminal 125, the VoIP gateway 113, the SLIC 131, the RJ11 terminal 123 and the extension line 145.

Irrespective of the positions of the switches SW1, SW2 and SW3, a communicating IP phone is connected to the IP phone 147 via the Internet, the exchanger, the public telephone line 141, the splitter 101, the xDSL modem 103, the router 105, the hub 107 and the IP network 143.

A call to the IP phone 147 made from a general telephone connected to the public telephone line reaches the IP phone 147 via the splitter 101, the xDSL modem 103, the router 105, the hub 107 and the IP network 143.

Figure 9:
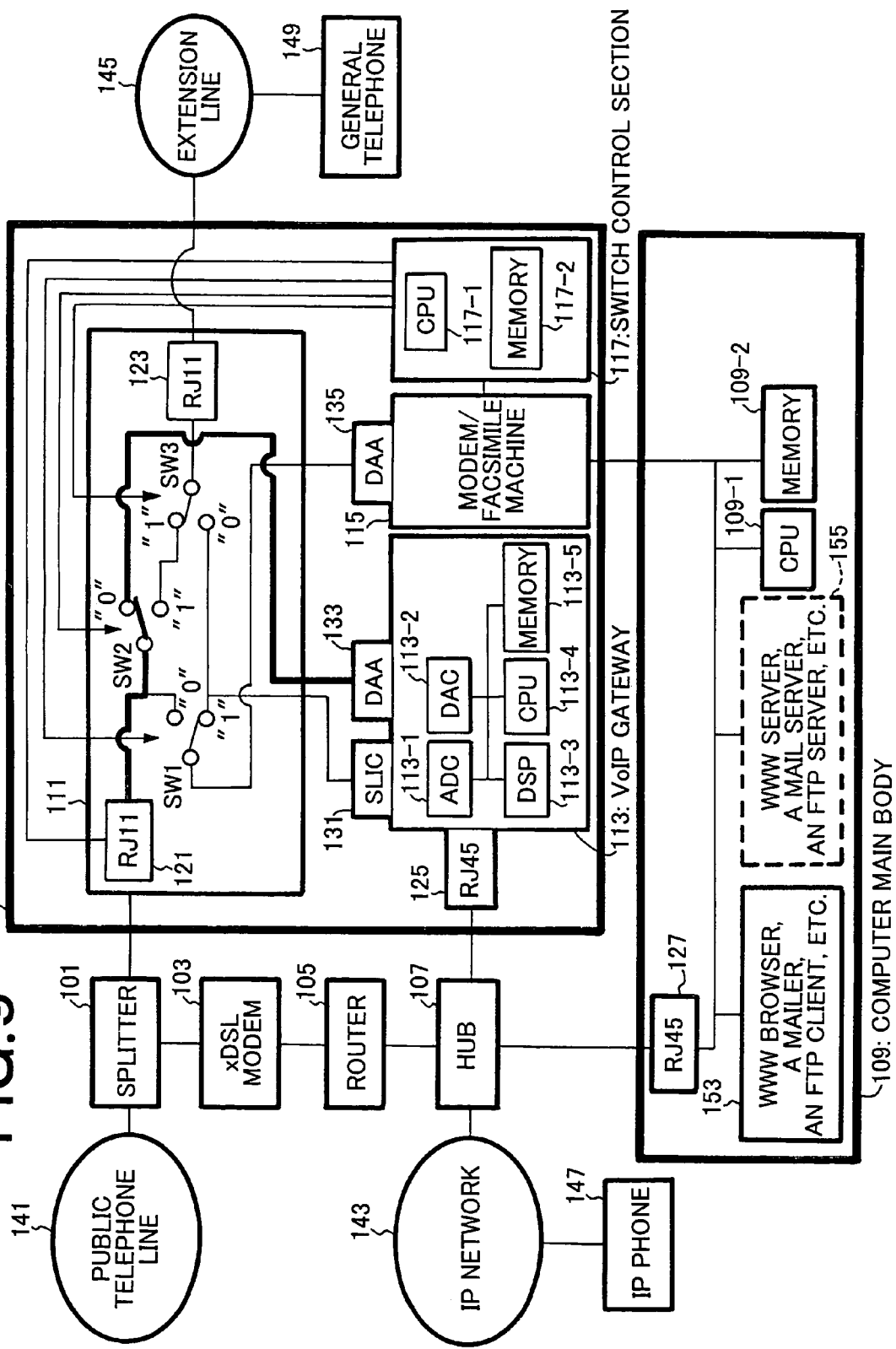
FIG. 9 is a diagram showing the first connection relationship when the switch positions of the communication line connecting adapter are SW1="1", SW2="0" and SW3="1"

As shown in FIG. 9, when the common terminal of the switch SW1 is connected to the first node terminal thereof, the common terminal of the switch SW2 is connected to the zeroth node terminal thereof and the common terminal of the switch SW3 is connected to the first node terminal thereof, the RJ11 terminal 121 is connected to the DAA circuit 133. Therefore, the VoIP gateway 113 is connected to the public telephone line 141. Meanwhile, the modem/facsimile machine 115 is disconnected from the public telephone line 141.

Figure 10:
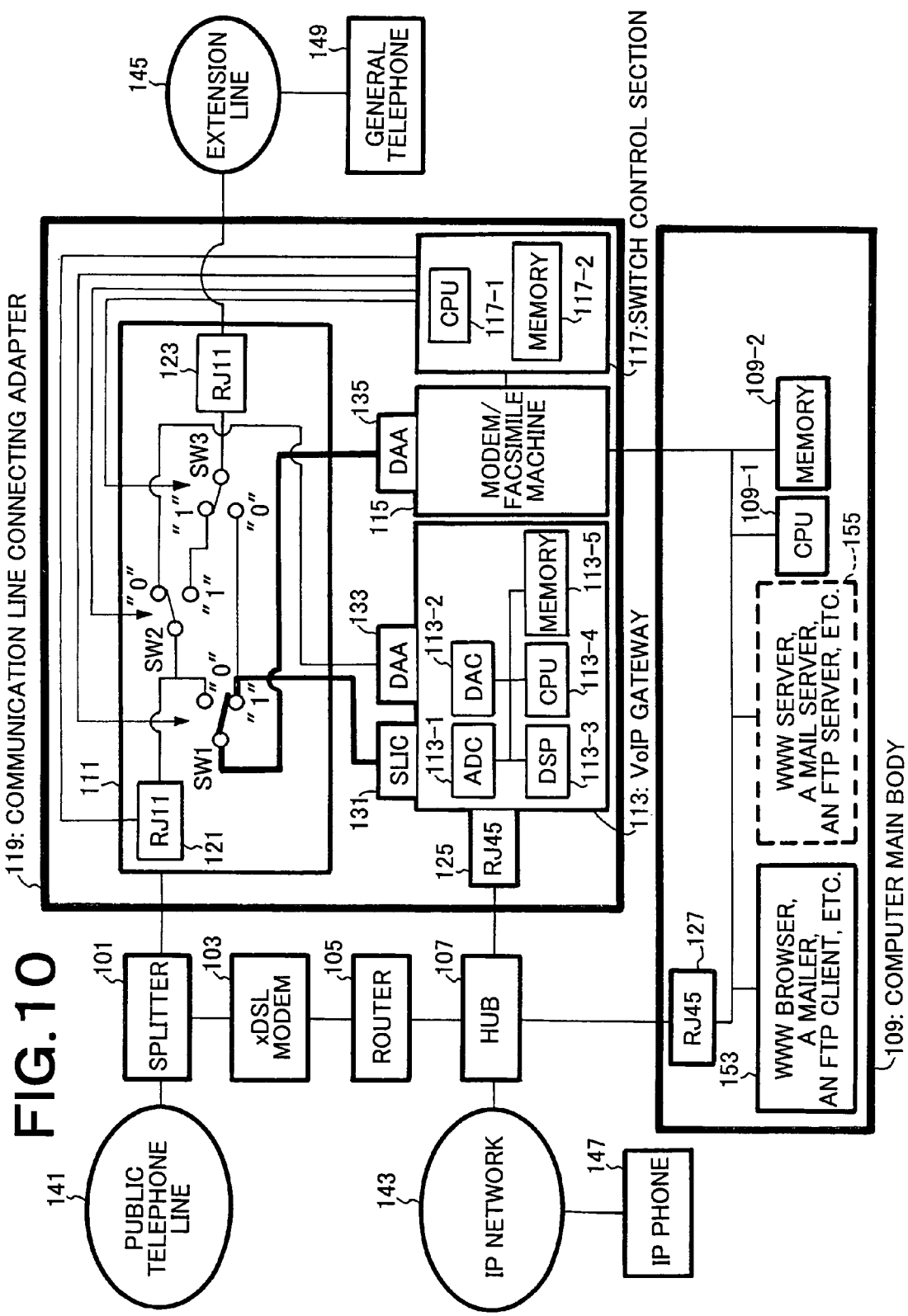
FIG. 10 is a diagram showing the second connection relationship when the switch positions of the communication line connecting adapter are SW1="1", SW2="0" and SW3="1"

As shown in FIG. 10, when the common terminal of the switch SW1 is connected to the first node terminal thereof, the common terminal of the switch SW2 is connected to the zeroth node terminal thereof and the common terminal of the switch SW3 is connected to the first node terminal thereof, the SLIC 131 is connected to the DAA circuit 135. Therefore, the VoIP gateway 113 is connected to the modem/facsimile machine 115. In this case, if the modem/facsimile machine 115 has a voice message generating capability, a voice message can be transferred to the IP phone 147 via the VoIP gateway 113.

Figure 11:
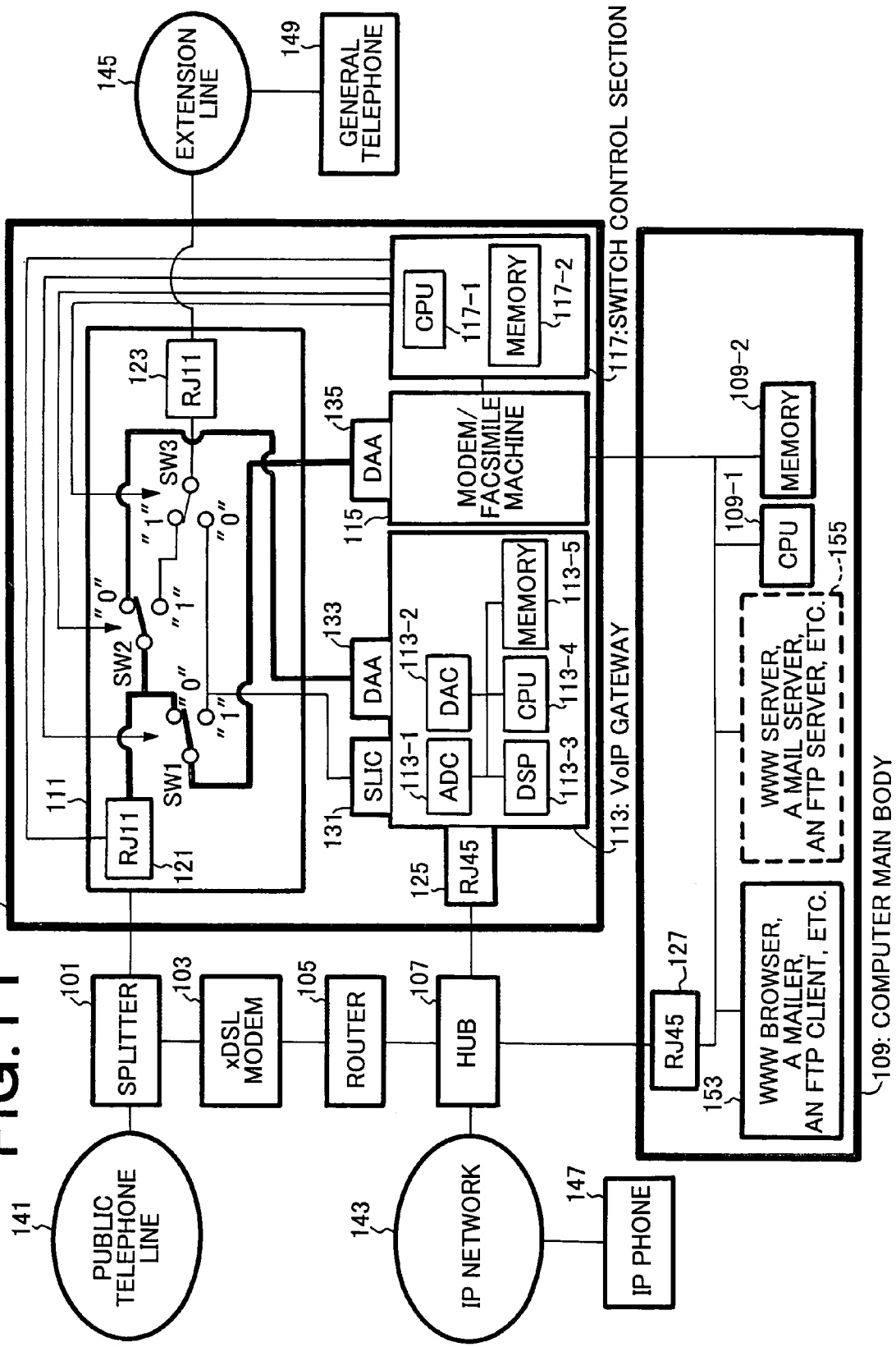
FIG. 11 is a diagram showing a connection relationship when the switch positions of the communication line connecting adapter are SW1="0", SW2="0" and SW3="1"

As shown in FIG. 11, when the common terminal of the switch SW1 is connected to the zeroth node terminal thereof, the common terminal of the switch SW2 is connected to the zeroth node terminal thereof and the common terminal of the switch SW3 is connected to the first node terminal thereof, the RJ11 terminal 121 is connected to the DAA circuit 133 and DAA circuit 135. Therefore, the VoIP gateway 113 and the modem/facsimile machine 115 are connected to the public telephone line 141. When there is a call from the public telephone line 141, the switch connection relationship shown in FIG. 11 may be used instead of the switch connection relationship shown in FIG. 3.

Figure 12:
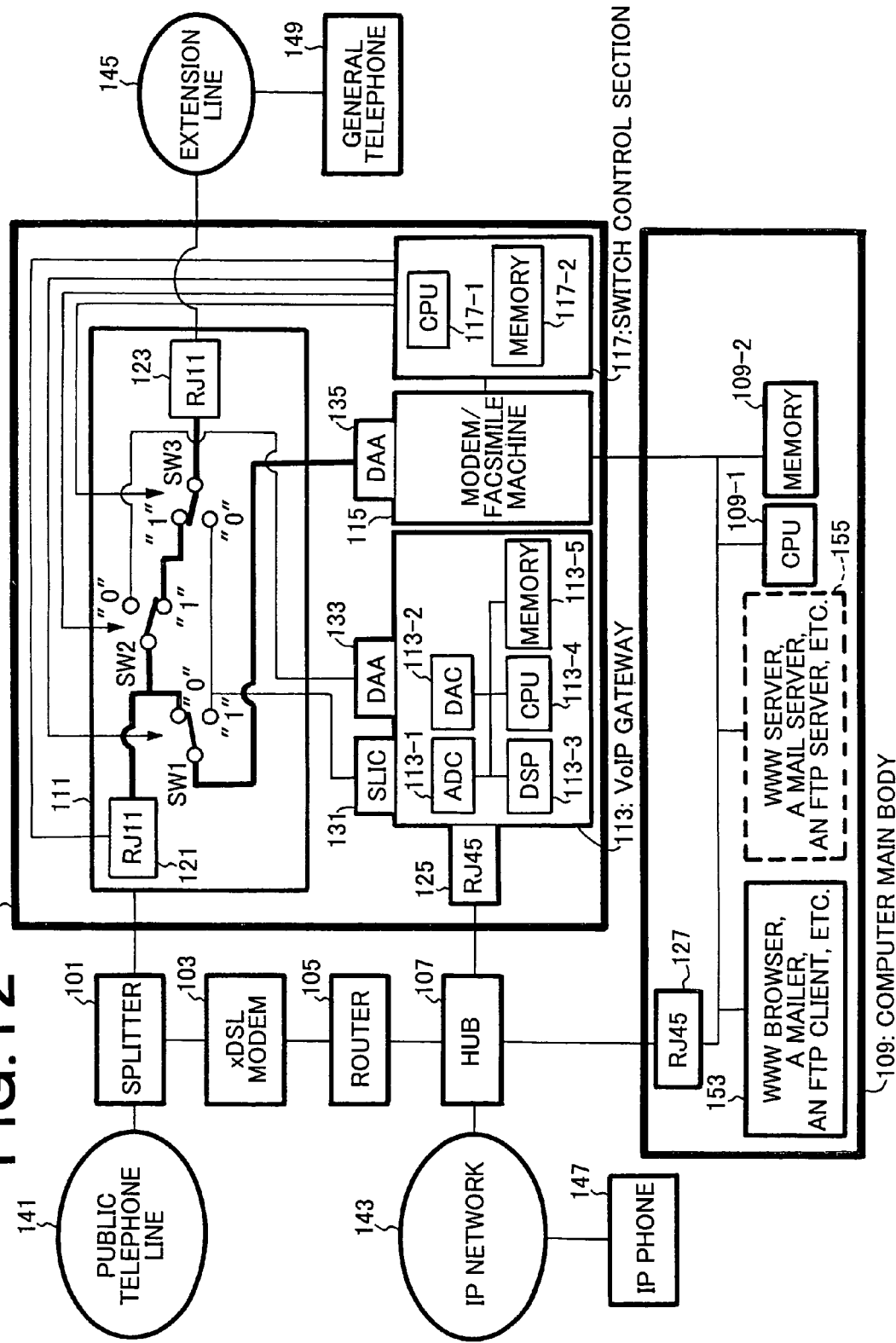
FIG. 12 is a diagram showing a connection relationship when the switch positions of the communication line connecting adapter are SW1="0", SW2="1" and SW3="1"

As shown in FIG. 12, when the common terminal of the switch SW1 is connected to the zeroth node terminal thereof, the common terminal of the switch SW2 is connected to the first node terminal thereof and the common terminal of the switch SW3 is connected to the first node terminal thereof, the RJ11 terminal 121 is connected to the DAA circuit 135 and the RJ11 terminal 123. Therefore, the VoIP gateway 113 and the extension line 145 are connected to the public telephone line 141. If the modem/facsimile machine 115 has a voice recording capability, while the general telephone 149 is talking, the talking can be recorded by the modem/facsimile machine 115.

Figure 13:
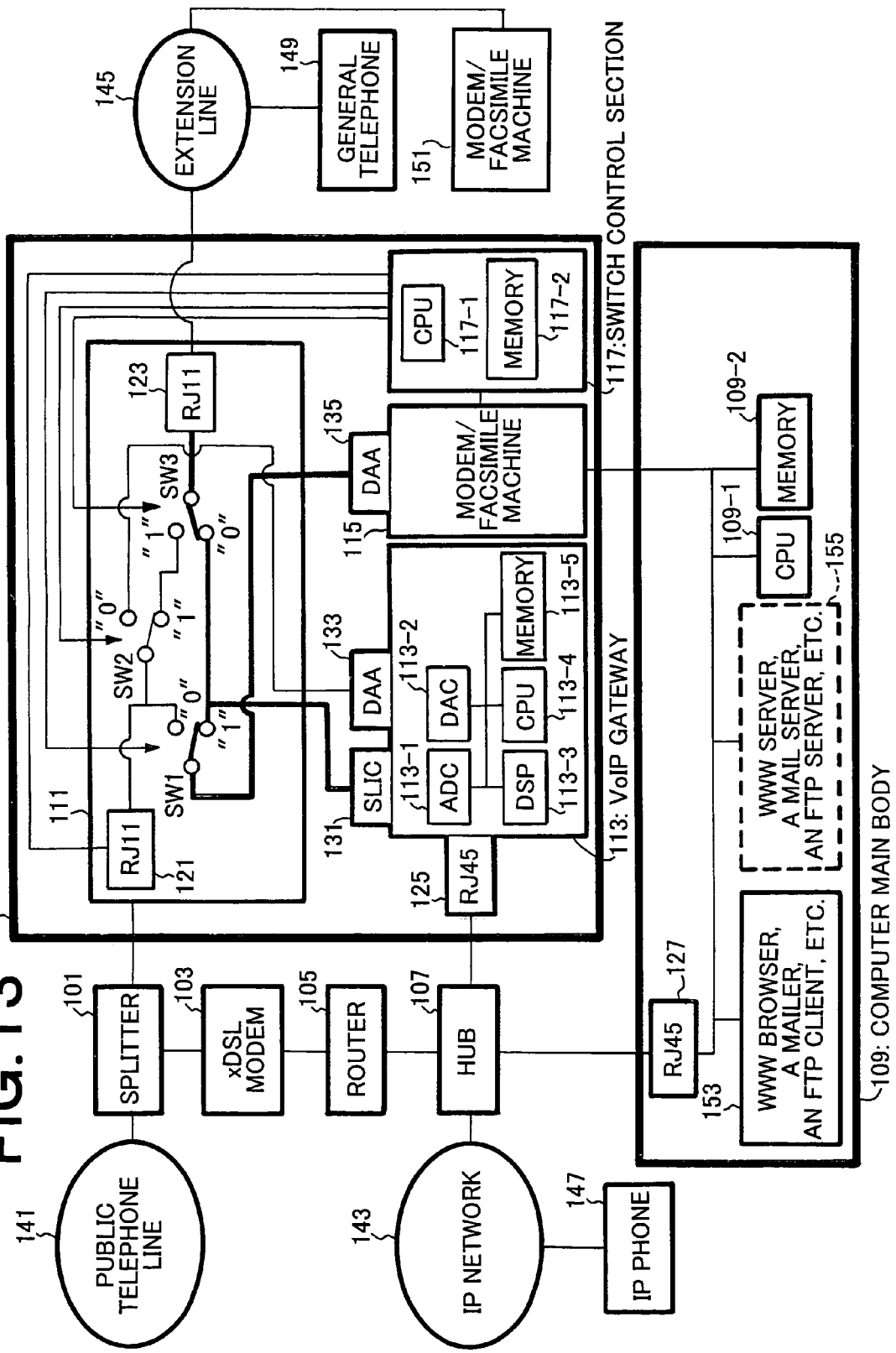
FIG. 13 is a diagram showing a connection relationship when the switch positions of the communication line connecting adapter are SW1="1", SW2="1" and SW3="0"

As shown in FIG. 13, when the common terminal of the switch SW1 is connected to the first node terminal thereof, the common terminal of the switch SW2 is connected to the first node terminal thereof and the common terminal of the switch SW3 is connected to the zeroth node terminal thereof, the RJ11 terminal 123 is connected to the SLIC 131 and the DAA circuit 135. Therefore, the VoIP gateway 113 and the modem/facsimile machine 115 are connected to the extension line 145. In this case, the IP phone 147 and the general telephone 149 can talk to each other via the VoIP gateway 113. If modem/facsimile machine 151 is connected to the extension line 145, the modem/facsimile machine 151 can communicate with the modem/facsimile machine 115. As one application of the mutual connection between the modem/facsimile machines, for example, it is possible to temporarily store facsimile data received by the modem/facsimile machine 115 in the memory 109-2 and print the facsimile data which needs to be printed on the modem/facsimile machine 151 connected to the extension line 145. Further, a word processor document stored in the computer main body 109 can be printed on the modem/facsimile machine 151, thereby making it possible to cope with the case where no printer is connected to the computer main body 109. Furthermore, an image scanned by the modem/facsimile machine 151 connected to the extension line 145 can be stored in the computer main body 109, thus allowing the modem/facsimile machine 151 to be used as an image scanner.

The connection between the RJ11 terminal 123 and the DAA circuit 135 is also achieved by the switch connection relationship shown in FIG. 5.

The control on switching of the communication channel between the VoIP gateway 113 and the modem/facsimile machine 115 will be described hereunder referring to FIG. 14. The switching control is executed by the switch control section 117.

First, the switch control section 117 stands by until a call from the public telephone line 141 reaches the RJ11 terminal 121 (step S201). When a call is received (YES in step S201), the common terminals of the switches SW1, SW2 and SW3 are connected to the respective zeroth node terminals to connect the VoIP gateway 113 and modem/facsimile machine 115 to the public telephone line 141 and set the VoIP gateway 113 and modem/facsimile machine 115 on-hooked (step S203).

Next, it is judged whether or not a control signal to start modem communication or a control signal to start facsimile communication has been received in a period from the event of step S203 to a point when a predetermined time elapses (steps S205, S207 and S209). When the control signal to start modem communication has been received in a period from the event of step S203 to the point when the predetermined time elapses (YES in step S205), or the control signal to start facsimile communication has been received in that period (YES in step S207), the flow goes to step S221 but the flow goes to step S211 otherwise.

In step S211, as the common terminal of the switch SW1 is connected to the first node terminal thereof, the modem/facsimile machine 115 is disconnected from the public telephone line 141 to be on-hooked. Next, it is judged whether or not on-hooking of the communicating party is detected during VoIP talking (step S213) and it is further judged whether or not a control signal for termination of talking is detected during VoIP talking (step S215). When on-hooking of the communicating party is detected during VoIP talking (YES in step S213) or a control signal for termination of talking is detected during VoIP talking (YES in step S215), the VoIP gateway 113 is disconnected from the public telephone line 141 to be on-hooked by connecting the common terminal of the switch SW2 to the first node terminal (step S217).

In step S221, the VoIP gateway 113 is disconnected from the public telephone line 141 to be on-hooked by connecting the common terminal of the switch SW2 to the first node terminal thereof. Next, it is judged whether or not a control signal for termination of talking is detected during modem communication or facsimile communication (step S223). When such detection is made (YES in step S223), the modem/facsimile machine 115 is disconnected from the public telephone line 141 to be on-hooked by connecting the common terminal of the switch SW1 to the first node terminal (step S225).

As apparent from the above, the present embodiment has the following effects.

The IP phone 147 can receive all of a call made from another IP phone for the IP phone 147, a call made from a general telephone for the IP phone 147, a call made from another IP phone for the general telephone 149 and a call made from a general telephone for the general telephone 149. In making a call from the IP phone 147, the channel from the IP network 143 to the hub 107, the router 105, the xDSL modem 103 and the splitter 101 is used.

The general telephone 149 can be connected to an IP phone connected to a local IP network or a global IP network.

Further, talking using the general telephone 149 on the local side and a general telephone on the communicating party side is possible.

Furthermore, as connection to the communication destination for the modem/facsimile machine and the VoIP gateway is controlled by the method illustrated in FIG. 14, the user need not perform an operation to control the connection.

Obviously many modifications and variations of the present invention are possible in light of the above teaching. It is therefore to be understood that within the scope of the appended claims in the invention may be practiced otherwise than as specifically described.

What is claimed is:

1. A communication line connecting adapter comprising:
    a Voice over Internet Protocol (VoIP) gateway which performs protocol conversion for telephone communication;
    means which connects a call for a general telephone to said general telephone;
    means which connects a call for an IP (Internet Protocol) phone to said general telephone via said VoIP gateway; and
    means which connects a call for said general telephone to said IP phone via said VoIP gateway.

2. The communication line connecting adapter according to claim 1, further comprising:
    means which connects an incoming call to said VoIP gateway and a modem/facsimile section;
    means which judges whether or not a control signal for initiating facsimile communication or modem communication has come from a calling party;
    means which disconnects said VoIP gateway from a public telephone line when it is judged that said control signal has come; and
    means which disconnects said modem/facsimile section from said public telephone line when it is judged that said control signal has not come yet.

3. The communication line connecting adapter according to claim 1, further comprising:
    a modem/facsimile section which performs modem communication and facsimile communication; and
    means which connects said VoIP gateway to said modem/facsimile section.

4. The communication line connecting adapter according to claim 1, further comprising:
    a modem/facsimile section which performs modem communication and facsimile communication; and
    means which connects said modem/facsimile section to an outside line.

5. The communication line connecting adapter according to claim 1, further comprising:
    a modem/facsimile section which performs modem communication and facsimile communication; and
    means which connects said modem/facsimile section to an extension line.

6. A communication line connecting adapter which connects a public telephone line, a VoIP (Voice over Internet Protocol) gateway and a modem/facsimile section and comprises:
    means which connects said public telephone line to said VoIP gateway and said modem/facsimile section when there is an incoming call from said public telephone line;
    means which judges whether or not a control signal for initiating facsimile communication or modem communication has come from a calling party;
    means which disconnects said VoIP gateway from said public telephone line when it is judged that said control signal has come; and
    means which disconnects said modem/facsimile section from said public telephone line when it is judged that said control signal has not come yet.

7. A communication line connecting method which connects a public telephone line, a VoIP (Voice over Internet Protocol) gateway and a modem/facsimile section and comprises the steps of:
    connecting said public telephone line to said VoIP gateway and said modem/facsimile section when there is an incoming call from said public telephone line;
    judging whether or not a control signal for initiating facsimile communication or modem communication has come from a calling party;
    disconnecting said VoIP gateway from said public telephone line when it is judged that said control signal has come; and
    disconnecting said modem/facsimile section from said public telephone line when it is judged that said control signal has not come yet.

* * * * *